(12) United States Patent
Ghiotto

(10) Patent No.: US 11,961,982 B2
(45) Date of Patent: Apr. 16, 2024

(54) ELECTRIC OR HYBRID MOTOR-VEHICLE WITH COOLING SYSTEM FOR COOLING REMOVABLE BATTERY MODULES

(71) Applicant: ITALDESIGN-GIUGIARO S.P.A., Turin (IT)

(72) Inventor: Giovanni Ghiotto, Turin (IT)

(73) Assignee: ITALDESIGN-GIUGIARO S.P.A., Turin (IT)

(*) Notice: Subject to any disclaimer, the term of this patent is extended or adjusted under 35 U.S.C. 154(b) by 556 days.

(21) Appl. No.: 17/287,262

(22) PCT Filed: Sep. 26, 2019

(86) PCT No.: PCT/IB2019/058166
§ 371 (c)(1),
(2) Date: Apr. 21, 2021

(87) PCT Pub. No.: WO2020/084363
PCT Pub. Date: Apr. 30, 2020

(65) Prior Publication Data
US 2021/0399356 A1 Dec. 23, 2021

(30) Foreign Application Priority Data
Oct. 25, 2018 (IT) .................. 102018000009787

(51) Int. Cl.
*H01M 10/625* (2014.01)
*B60K 1/04* (2019.01)
(Continued)

(52) U.S. Cl.
CPC ............ *H01M 10/625* (2015.04); *B60K 6/28* (2013.01); *B60L 50/64* (2019.02); *B60L 58/26* (2019.02);
(Continued)

(58) Field of Classification Search
CPC .... B60K 6/28; B60K 1/04; B60K 2001/0461; H01M 10/625; H01M 10/613;
(Continued)

(56) References Cited

U.S. PATENT DOCUMENTS 9,070,958 B2 * 6/2015 Obasih ............... H01M 10/625
2012/0263988 A1 10/2012 Obasih et al.
(Continued)

FOREIGN PATENT DOCUMENTS

WO 2013031406 A1 3/2013
WO 2017177831 A1 10/2017

OTHER PUBLICATIONS

International Search Report, issued in PCT/IB2019/058166, dated Jan. 17, 2020, Rijswijk, Netherlands.

*Primary Examiner* — Marc E Norman
(74) *Attorney, Agent, or Firm* — Valauskas Corder LLC

(57) ABSTRACT

An electric or hybrid motor-vehicle having a modular battery system having at least one fixed battery module and at least one removable battery module is provided. The removable battery module has an outer casing that receives a first thermally conductive plate and at least one rechargeable battery pack, placed in contact with the first thermally conductive plate. An internal circuit extending inside the first thermally conductive plate is filled with a heat transfer fluid. A second thermally conductive plate is fluidly connected to the internal circuit so as to be flowed through by the heat transfer fluid flowing in the internal circuit and is arranged with an outer face thereof outside the outer casing to be placed in contact with a direct expansion plate of an auxiliary cooling circuit installed on the electric or hybrid motor-vehicle.

6 Claims, 2 Drawing Sheets

(51) Int. Cl.
*B60K 6/28* (2007.10)
*B60L 50/64* (2019.01)
*B60L 53/80* (2019.01)
*B60L 58/26* (2019.01)
*H01M 10/613* (2014.01)
*H01M 10/6554* (2014.01)
*H01M 10/6568* (2014.01)
*H01M 10/6569* (2014.01)
*B60K 1/00* (2006.01)

(52) U.S. Cl.
CPC ..... *H01M 10/613* (2015.04); *H01M 10/6554* (2015.04); *H01M 10/6568* (2015.04); *H01M 10/6569* (2015.04); *B60K 2001/005* (2013.01); *B60K 1/04* (2013.01); *B60K 2001/0438* (2013.01); *B60L 53/80* (2019.02); *B60Y 2200/91* (2013.01); *B60Y 2200/92* (2013.01); *B60Y 2306/05* (2013.01); *B60Y 2400/112* (2013.01); *H01M 2220/20* (2013.01)

(58) Field of Classification Search
CPC ......... H01M 10/6554; H01M 10/6568; H01M 10/6569; B60L 50/64; B60L 53/26; B60L 53/60; B60Y 2200/91; B60Y 2200/92; B60Y 2306/05
See application file for complete search history.

(56) References Cited

U.S. PATENT DOCUMENTS

| | | |
|---|---|---|
| 2017/0125865 A1 | 5/2017 | Mascianica et al. |
| 2019/0131674 A1 | 5/2019 | Lu et al. |
| 2022/0013856 A1* | 1/2022 | Zeng ................ H01M 50/3425 |
| 2022/0123389 A1* | 4/2022 | Chopard ............. H01M 10/625 |

* cited by examiner

ELECTRIC OR HYBRID MOTOR-VEHICLE WITH COOLING SYSTEM FOR COOLING REMOVABLE BATTERY MODULES

CROSS-REFERENCE TO RELATED APPLICATIONS

This application is a U.S. National Phase filing of PCT International Patent Application No. PCT/IB2019/058166, having an international filing date of Sep. 26, 2019, which claims priority to Italian Patent Application No. 102018000009787, filed Oct. 25, 2018 each of which is hereby incorporated by reference in its entirety.

FIELD OF THE INVENTION

The present invention relates in general to a motor-vehicle with electric or hybrid drive, and more specifically a motor-vehicle provided with a modular battery system.

BACKGROUND OF THE INVENTION

As is known, the high cost of an electric or hybrid vehicle is mainly due to the high cost of battery cells. To overcome this drawback, modular battery systems have been introduced, which comprise one or more fixed battery modules and one or more additional battery modules that can be installed or uninstalled depending on the needs.

FIG. 1 of the accompanying drawings shows a bottom view of an electric or hybrid vehicle, generally indicated at V, which is provided with an electric power supply assembly including a plurality of rechargeable battery modules B1 and B2, located in a suitable housing space on the vehicle floor, for supplying an electric propulsion system of the vehicle, as well as a battery management system BMS to which the battery modules B1 and B2 are connected. The battery modules B1 (two modules, in the illustrated example), hereinafter referred to as fixed battery modules, are permanently installed on board of the vehicle, and therefore permanently connected to the battery management system BMS, while the battery modules B2 (also two in number, in the illustrated embodiment), hereinafter referred to as removable battery modules, can be installed on request on board of the vehicle and be quickly replaced by simple extraction (lateral, as indicated by arrows F in FIG. 1, or rearward) from the vehicle. The removable battery modules B2 can be connected via respective connectors N to the battery management system BMS.

It has been proven that, when a battery cell is subject to a discharge or charge step, in particular a fast charge cycle, or to a high power request (for example during acceleration), a certain amount of energy is dissipated by Joule effect in the form of heat. In order for the performance of the cells constituting a battery to remain constant and the useful life thereof to be increased, the heat thus generated must be properly dissipated. The solutions currently envisaged for cooling the batteries are the following three: air cooling (with the possible use of a secondary evaporator), liquid cooling (with the possible use of an auxiliary chiller) and cooling by direct expansion via a conductive plate.

The batteries must be kept in a completely water-tight, safe and shock-resistant environment. On the other hand, with the exception of air cooling, the other known cooling solutions mentioned above require connections between the batteries and the cooling system. There is therefore the problem, in a modular battery system such as the one described above, of ensuring effective cooling of the removable battery modules.

SUMMARY OF THE INVENTION

It is therefore an object of the present invention to provide a system for cooling removable battery modules of a modular battery system of a motor-vehicle with electric or hybrid drive which on the one hand allows to efficiently cool the removable battery modules and on the other ensures the necessary water tightness of the removable battery modules.

This and other objects are fully achieved by a motor-vehicle with a modular battery system as described and claimed herein.

In short, the present invention is based on the idea of providing the motor-vehicle with a modular battery system having at least one removable battery module comprising
an outer casing,
a first thermally conductive plate received inside said casing,
one or more battery packs received inside said casing and arranged in contact with said first thermally conductive plate,
an internal circuit that extends inside said first thermally conductive plate and is filled with a heat transfer fluid, and
a second thermally conductive plate which is fluidly connected to said internal circuit so as to be flowed through by the heat transfer fluid flowing in said internal circuit and is arranged with an outer face thereof outside of said casing, and
also providing the motor-vehicle with an auxiliary cooling circuit having at least one direct expansion plate which is fixed to the motor-vehicle and is adapted to be placed in contact with the second plate of the at least one removable battery module, when the latter is installed on the motor-vehicle.

Due to such a configuration of the battery module, the heat generated by the battery pack (or packs) is transmitted by conduction to the first plate and, through the heat transfer fluid flowing in the internal circuit, conveyed from the first plate to the second plate, where it can be dissipated by conduction outside the battery module by contact of the outer face of the second plate with a corresponding face of a direct expansion plate fixed to the vehicle in such a position as to come into contact with the second plate of the battery module when the latter is installed on the vehicle. A cooling system for cooling the removable battery modules is thus is obtained, which first of all allows to minimize the increase in weight and costs of the vehicle, given that most of the components of the cooling system are installed in the battery module itself. Moreover, such a cooling system, although using a heat transfer fluid, does not require connections between the internal circuit of the battery module and the vehicle air conditioning system, and therefore allows to ensure water tightness of the battery module. A further advantage of the present invention is the high cooling efficiency due to the use of a heat transfer fluid for transferring heat from the first plate to the second plate, and therefore from the inside to the outside of the casing of the battery module.

BRIEF DESCRIPTION OF THE DRAWINGS

Further features and advantages of the present invention will become more apparent from the following detailed description, given purely by way of a non-limiting example, with reference to the accompanying drawings, in which.

DETAILED DESCRIPTION

Figure 1:
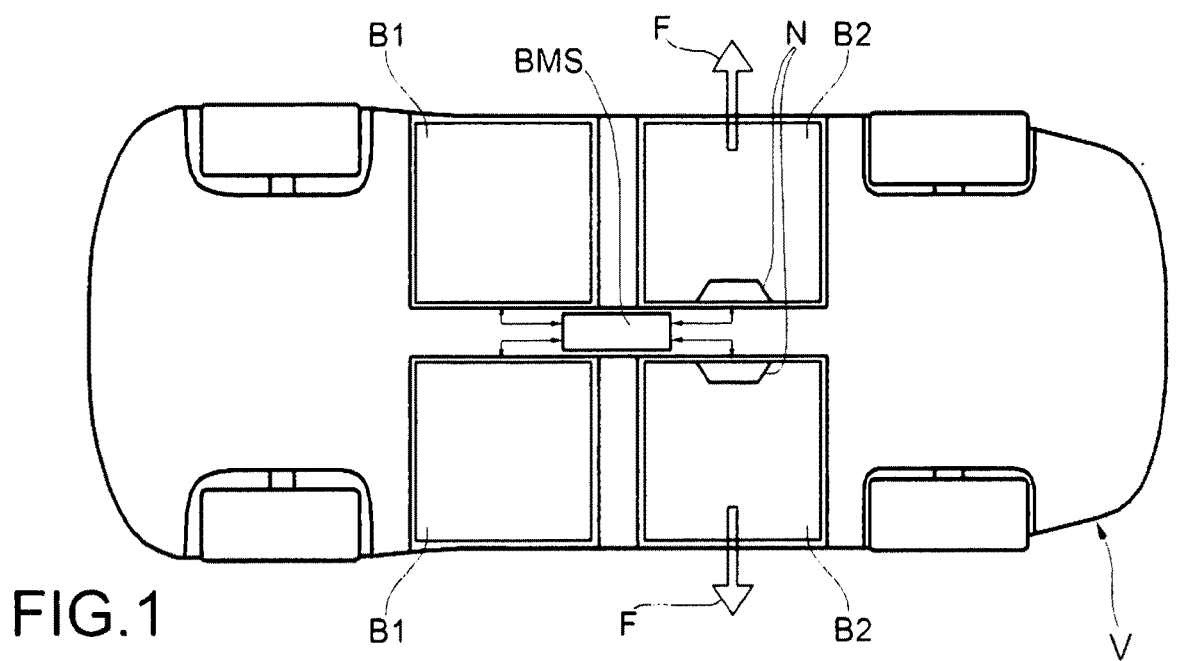
FIG. 1 is a bottom view of an electric or hybrid motor-vehicle provided with a modular battery system.
Figure 2:
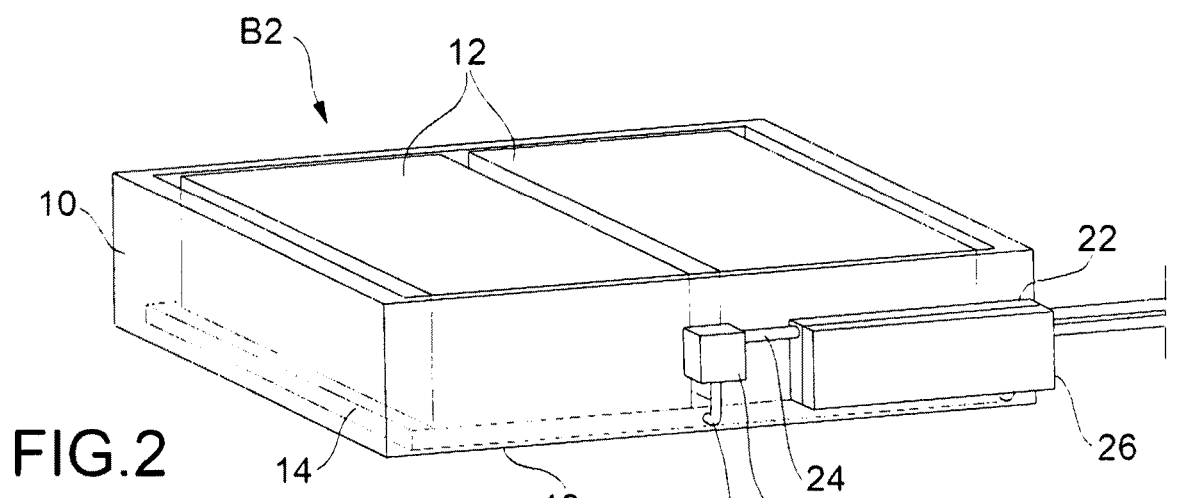
FIG. 2 is a perspective view of a removable battery module according to the present invention, which can be used in the modular battery system of the motor-vehicle of FIG. 1.
Figure 3:
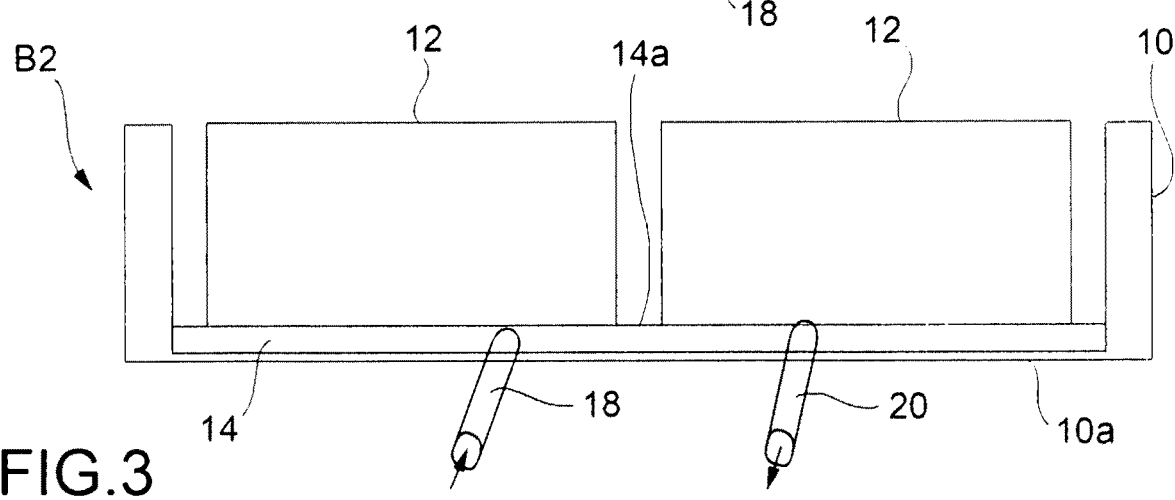
FIG. 3 is a front view of the removable battery module of FIG. 2.

With reference first to FIGS. 2 and 3, a removable battery module which can be used in a modular battery system like the one described above with reference to FIG. 1 is generally indicated with B2. As already explained above, the battery module B2 can be mounted on board of the vehicle by insertion along a given direction, preferably a horizontal direction (in particular a longitudinal direction or a transverse direction), and can be removed from the vehicle by extraction in the opposite direction to that of insertion.

The battery module B2 comprises first of all an outer casing 10 and one or more (rechargeable) battery packs 12 received inside the casing 10. In the embodiment illustrated in the drawings, the battery module B2 comprises two battery packs 12, but of course a different number of battery packs may be provided for.

The battery packs 12 are arranged in contact with a first thermally conductive plate 14 (hereinafter simply referred to as "first plate") also received inside the casing 10. Preferably, the first plate 14 is arranged on a bottom wall 10a of the casing 10 and the battery packs 12 rest on an upper face 14a of the first plate 14.

An internal circuit filled with a heat transfer fluid (for example water) is provided inside the first plate 14. The heat transfer fluid is caused to flow in the internal circuit by a pump 16, also received inside the casing 10. The internal circuit comprises an inlet tube 18, which extends from the delivery port of the pump 16 towards the inside of the first plate 14, and an outlet tube 20, which extends from the first plate 14.

As shown in FIG. 1, once mounted on board the vehicle the battery module B2 is connected by means of a connector N to the battery management system BMS of the vehicle. In addition to managing the flow of electrical power to and from the battery packs 12 of the battery module B2, the connector N also ensures the electrical and electronic connections necessary on the one hand to supply the pump 16 and on the other to control the temperature of the battery packs 12.

The battery module B2 further comprises a second thermally conductive plate 22 (hereinafter simply referred to as "second plate"), which is in fluid communication with the internal circuit so as to be flowed through by the heat transfer fluid flowing in the internal circuit. More specifically, the second plate 22 is connected on one side to the outlet tube 20 and on the other to the inlet of the pump 16 via a section of a connection tube 24. The heat transfer fluid then enters the second plate 22 through the outlet tube 20 and flows out of this plate through the connection tube 24, to then be caused by the pump 16 to flow in the remaining part of the circuit extending inside the first plate 14.

The second plate 22 is integral with the casing 10 and is arranged with an outer face 22a thereof outside of the casing 10, so that it ensures a perfect water tightness of the battery module B2 and can be placed in contact with a face 26a of a respective direct expansion plate 26 fixedly mounted on board of the vehicle, as will be explained in detail below.

A layer of soft conductive material is advantageously provided between the second plate 22 and the direct expansion plate 26 to compensate for the tolerances and for a possible non-perfect parallelism between the respective faces 22a and 26a in contact with one another.

Figure 4:
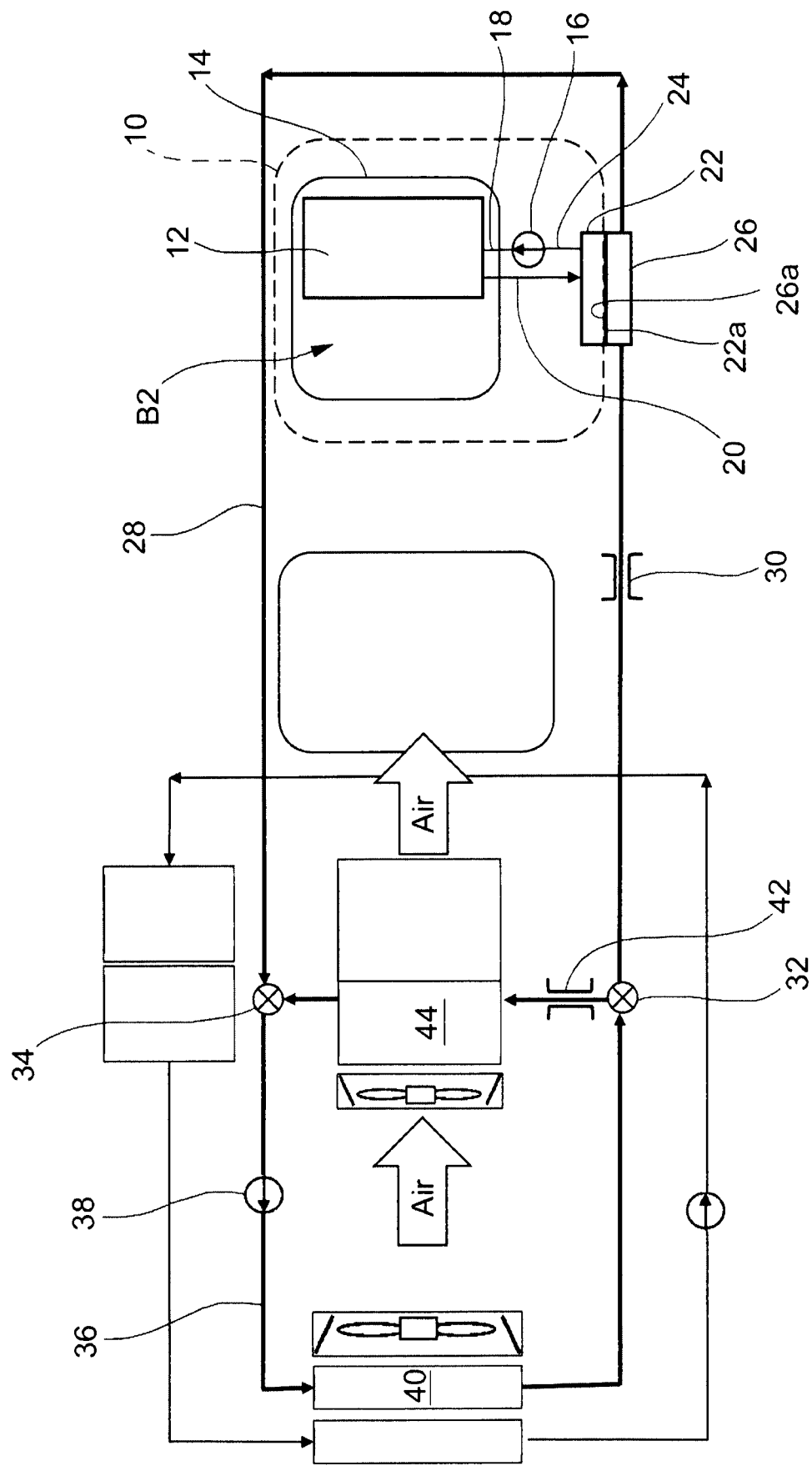
FIG. 4 is a schematic view of the air conditioning system of the motor-vehicle of FIG. 1 and of the cooling circuit associated with the removable battery module of FIGS. 2 and 3.

As shown in FIG. 4, the direct expansion plate 26 is installed along an auxiliary cooling circuit 28 in which cooling gas is caused to flow. The auxiliary cooling circuit 28 comprises a thermostatic expansion valve 30 (commonly known, and hereinafter indicated, as TXV valve) arranged in series with the direct expansion plate 26 to cool the latter, as well as the second plate 22 of the battery module B2.

With reference still to FIG. 4, the auxiliary cooling circuit 28 for cooling the removable battery module(s) B2 is advantageously integrated with an air conditioning system for conditioning the air in the passenger compartment of the vehicle. In particular, in the embodiment proposed herein the auxiliary cooling circuit 28 is connected by means of a three-way valve 32 and a non-return valve 34 to a main cooling circuit 36 of the air conditioning system of the vehicle, which comprises—in a per-se-known manner—a compressor 38, a condenser 40, a thermostatic expansion valve 42 and an evaporator 44 arranged in series with each other. By suitably controlling the three-way valve 32, the refrigerant gas of the main cooling circuit 36 can be made to flow also in the auxiliary cooling circuit 28 for cooling the removable battery module(s) B2. Naturally, the three-way valve 32 will be controlled to connect the main cooling circuit 36 with the auxiliary cooling circuit 28, and thus allow the flow of the refrigerant gas inside the latter, once the battery management system BMS has recognized the presence of at least one removable battery module B2.

Even if only one removable battery module is shown in the embodiment of FIG. 4, several removable battery modules may be provided, as already anticipated above, in which case either a single direct expansion plate, arranged so as to cooperate with the battery modules facing it, or several direct expansion plates, one for each battery module, may be provided. All direct expansion plates will be installed along the auxiliary cooling circuit 28.

In operation, the heat generated by the battery packs 12 is transmitted by conduction to the first plate 14 and, via the heat transfer fluid flowing in the internal circuit extending inside the first plate 14, conveyed from the first plate 14 to the second plate 22, where it can be dissipated by conduction (or rather, mainly by conduction) outside the battery module B2 by contact of the outer face 22a of the second plate 22 with the corresponding face 26a of the direct expansion plate 26. The flow of the heat transfer fluid in the circuit is controlled by the pump 16 under control of the battery management system BMS so as to maintain the temperature of the battery packs 12 within a given optimum temperature range.

It should be noted that the proposed embodiment of the present invention is purely by way of example and not limiting. A man skilled in the art can easily carry out the invention according to different embodiments which do not depart from the principles set forth herein and which are therefore to be considered as falling within the scope of the invention as defined in the appended claims.

This applies in particular to the possibility of providing a number and/or arrangement of the removable battery modules different from the one(s) illustrated herein.

The invention claimed is:

1. An electric or hybrid motor-vehicle comprising a modular battery system, the modular battery system comprising at least one fixed battery module permanently installed on board of the electric or hybrid motor-vehicle, at least one removable battery module, and a battery management system configured to manage operation of said battery modules,
   wherein said at least one removable battery module comprises: an outer casing, a first thermally conductive plate received inside said outer casing, at least one rechargeable battery pack, received inside said outer casing and placed in contact with said first thermally conductive plate, an internal circuit extending inside said first thermally conductive plate and filled with a heat transfer fluid, and a second thermally conductive plate fluidly connected to said internal circuit so as to be flowed through by the heat transfer fluid flowing in said internal circuit and arranged with an outer face thereof outside of said outer casing, and
   wherein the electric or hybrid motor-vehicle further comprises an auxiliary cooling circuit, said auxiliary cooling circuit comprising at least one direct expansion plate fixed to the electric or hybrid motor-vehicle and configured to be placed in contact with said second thermally conductive plate of said at least one removable battery module, when said at least one removable battery module is installed on the electric or hybrid motor-vehicle.

2. The electric or hybrid motor-vehicle of claim 1, wherein said at least one removable battery module further comprises a pump which is received inside said outer casing and is operable to cause the heat transfer fluid to flow in said internal circuit.

3. The electric or hybrid motor-vehicle of claim 2, wherein said at least one removable battery module further comprises sensors providing a signal indicative of a temperature of said at least one rechargeable battery pack, and electrical and electronic connectors configured to allow transmission of the signal provided by said sensors to said battery management system and to allow supply of said pump.

4. The electric or hybrid motor-vehicle of claim 1, wherein said auxiliary cooling circuit further comprises a thermostatic expansion valve arranged in series with said at least one direct expansion plate.

5. The electric or hybrid motor-vehicle of claim 1, further comprising a main cooling circuit for conditioning air in a passenger compartment of the electric or hybrid motor-vehicle, wherein said auxiliary cooling circuit is connected to said main cooling circuit via flow control valves to control flow of a refrigerant gas between said main cooling circuit and said auxiliary cooling circuit.

6. The electric or hybrid motor-vehicle of claim 5, wherein said battery management system is arranged to control said flow control valves to put said main cooling circuit in fluid communication with said auxiliary cooling circuit when the at least one removable battery module is installed on the electric or hybrid motor-vehicle.

\* \* \* \* \*